July 6, 1954 N. J. ROSSEN 2,682,730
METHOD FOR THE PRODUCTION OF FORMED GLASS ARTICLES
Filed Feb. 13, 1950 2 Sheets-Sheet 2
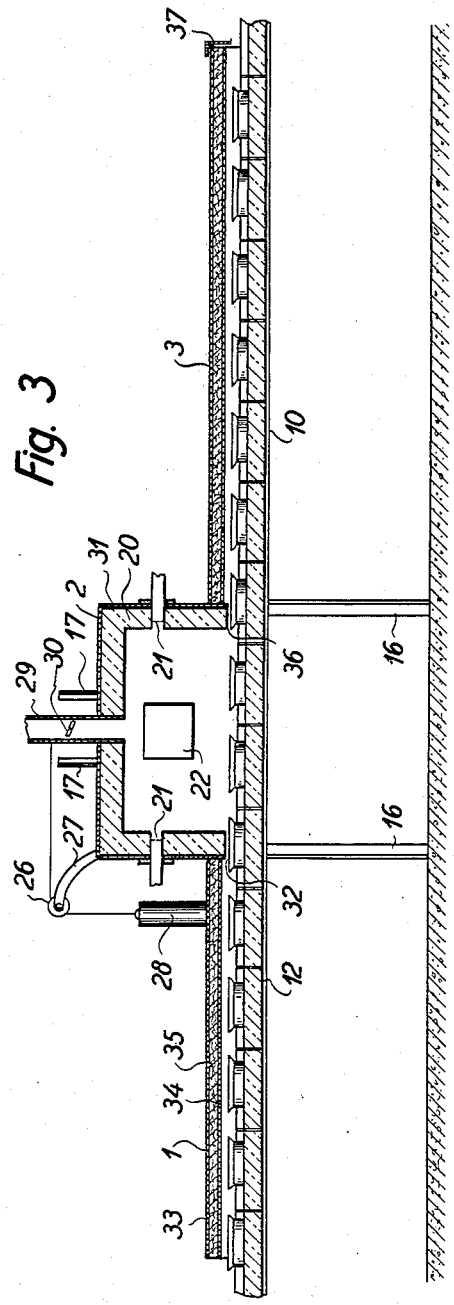
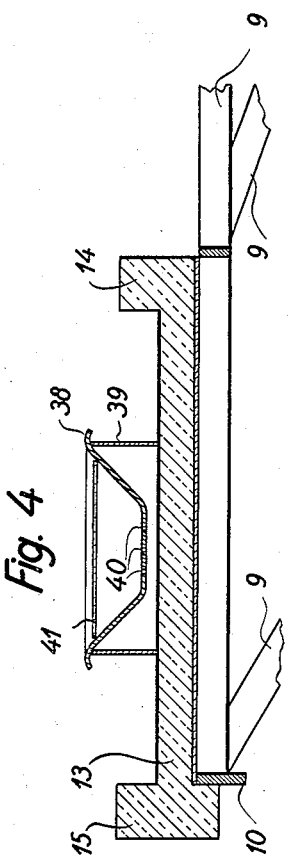
INVENTOR.
NICOLAI JACOB ROSSEN
BY
ATTORNEYS Patented July 6, 1954

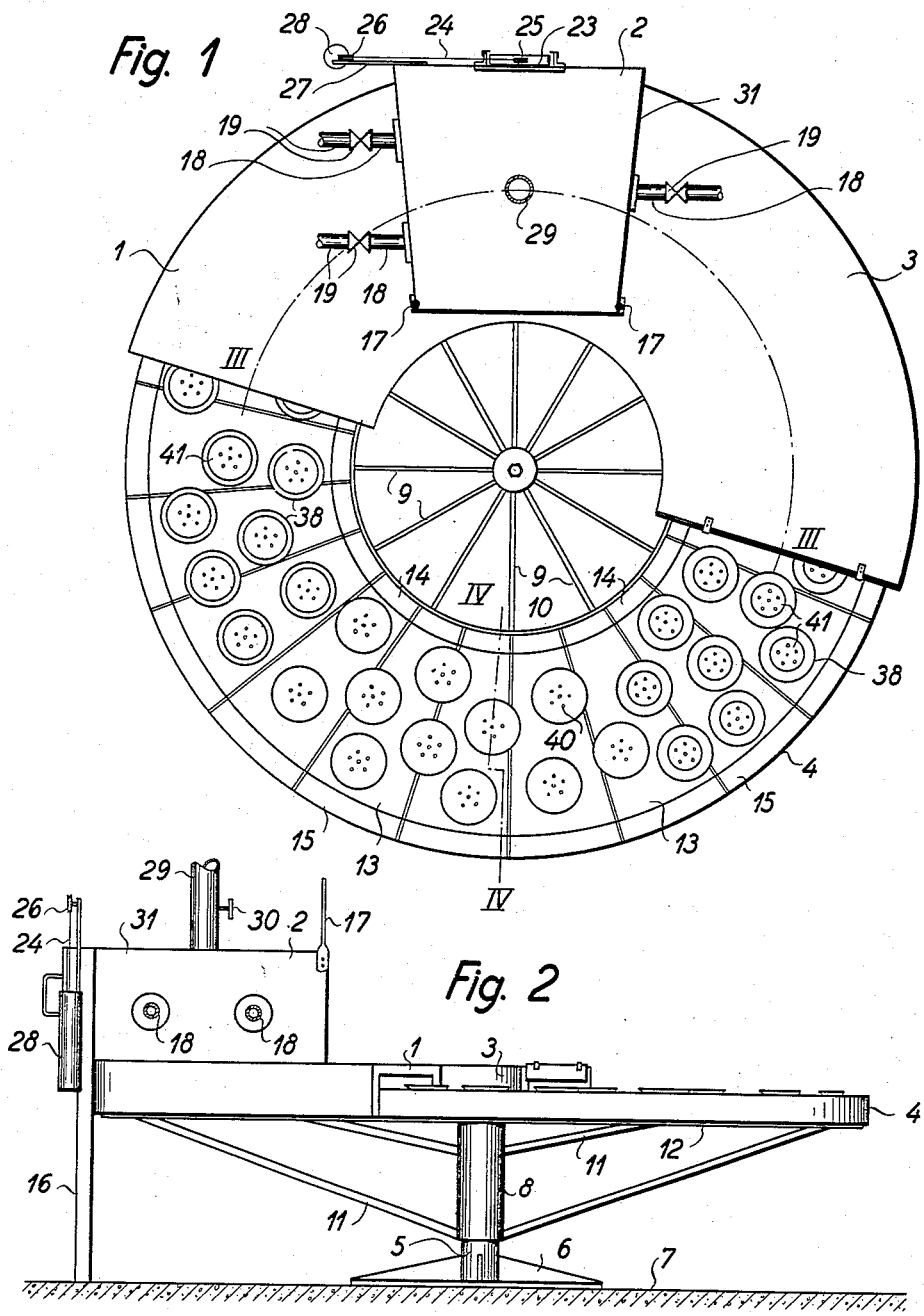

2,682,730

UNITED STATES PATENT OFFICE 2,682,730

METHOD FOR THE PRODUCTION OF
FORMED GLASS ARTICLES

Nicolai Jacob Rossen, Copenhagen, Denmark

Application February 13, 1950, Serial No. 143,878

Claims priority, application Denmark May 9, 1949

3 Claims. (Cl. 49—84)

It is known to produce articles of glass by bending of a plane glass sheet. The principle of procedure is to place a plane glass disc or sheet in e. g. a bowl-shaped mould made of cast iron or a refractory material said mould having a shape corresponding to the shape of the glass bowl which it is desired to produce. The mould with the glass disc is then pre-heated in a cabinet and carried manually, e. g. by means of a pitch-fork or fork, or mechanically by means of a carrier into an oven which is kept heated at such a temperature that the glass softens and conforms to the mould. The mould containing the formed glass bowl is then removed from the oven and placed in an asbestos-lined box for cooling.

However, during this cooling such heavy stresses will develop in the glass that it easily splinters even at a quite insignificant outside influence, indeed sometimes even by standing.

In order to remove these stresses the formed glass plate has hitherto been re-heated and then allowed to cool slowly. This renewed heating and slow cooling has taken place in annealing tunnels which often have a length of about 40 m., and through which conveyance requires several hours.

The present invention concerns a method of the above mentioned art, in which a glass sheet or plate is placed in a mould and together with the latter subjected to a pre-heating in a pre-heating zone and then transferred to a heating zone where the glass is heated to such a temperature that it becomes so soft that it sinks down into the mould to rest against its walls.

The invention further concerns a glass bending method in which a maximum bending of 40% is effected.

The object of the invention is to reduce the time hitherto employed in removal of the stresses in the formed glass articles.

Another object of the invention is to rationalize the entire production to such an extent that it will be better suited for mass production. Furthermore, it is an object of the invention to produce formed articles of glass which are completely free from any stresses.

The invention is based upon the observation that in order to attain the result aimed at, it is of decisive importance that the glass is not subjected to contact with the open air after it has been bent down in the mould, but is subjected to a slow cooling immediately after it has been bent down, and that the thickness of the mould is adapted to the thickness of the glass sheet or plate in such a manner that they give off the heat during cooling at substantially the same rate.

In accordance with the method of the invention the glass bent down to conform to the mould is transferred direct from the heating and bending zone to a cooling zone where a gradual cooling of the glass takes place.

In the conventional glass sorts bending is effected at a temperature of about 850° C., and the range of temperature at which stresses arise is ordinarily found between 500° C. and 300° C. The critical temperature may be somewhat different for special glasses, but as a principal rule the glass according to the invention should have a temperature under 400° C. when it leaves the cooling zone. However, to be on the safe side, it is expedient in practice that the glass does not leave the cooling zone until it has reached a temperature of about 200° or less. In consequence it will also be easier to handle the formed glass articles as they usually are removed from the moulds manually by the employment of heat-insulating gloves, e. g. asbestos gloves.

When proceeding as described above, thereby providing an evenly decreasing temperature in the cooling zone, usually from about 850° C. down to about 200° C., it has been found that the formed glass articles do not show any stresses at all, which may be ascertained by fluoroscopy of the articles by polarized light.

According to a preferred embodiment of the method the moulds with the plane glass plates or sheets are continuously being transferred from the pre-heating zone through the heating or bending zone to the cooling zone without contacting the open air. By letting the pre-heating take place immediately before and in connection with the actual bending during the heating an improved economy is obtained, whereas the method becomes better suited for mass production. Furthermore, it is hereby possible according to the invention to heat the pre-heating zone by the heat from the heating or bending zone, which also improves the economy.

Moreover, the experiments leading to the present invention have shown that it is of importance to adapt the emission of heat of the mould to the size and thickness of the glass plate or sheet of which the formed glass article is produced. If the mould emits its heat essentially slower than the glass, so great a difference in temperature may arise between the outside surface of the glass and the part of the glass in contact with the heated mould that stresses arise in the formed article, even though a slow and even cooling takes place direct from the heating zone. According to the invention the material and thickness of the wall of the mould should therefore be adapted to the size and thickness of the glass plate or sheet ensuring that the latter and the mould in the main are being cooled at the same rate.

It has also been found that it is possible by the method of the invention at the same time to superinduce on the glass articles a very durable decoration of any desired appearance such as patterns, drawings, photographic reproductions and the like, in such a way that the bending of the glass and the decorating may be effected at one and the same operating stage, and thereby obtain decorated glass articles which are completely free from internal stresses.

According to the invention an oil is superinduced in the desired decoration on the plane glass sheet before it is placed in the mould for preheating, bending and subsequent cooling, the oil burning completely away at the bending temperature of the glass, and the spots of the glass sheet covered with oil are then superinduced with a dye powder containing an inorganic pigment and a flux which melts at the bending temperature of the glass.

When the thus decorated plane glass sheet thereupon is placed in a mould of the kind described and subjected to the bending as described, the superinduced oil will be burned away during the bending, just as the flux employed will melt during absorption of the pigment which melts and adheres to the surface of the glass.

The decoration of the plane glass sheet with the said oil may be effected in a way known per se, e. g., an electro impression of the desired decoration in oil being transferred on to the plane glass sheet by means of an offset machine. The dye powder containing the inorganic pigment and flux may expediently be superinduced by blasting, e. g., by compressed air, as the dye powder will only adhere to the spots of the glass sheet where oil has been superinduced. As stated above the oil utilized must possess the property that it burns completely away at the bending temperature of the glass. No residue must appear which may influence the colour of the decoration aimed at. It has been found that etheric oils are especially suitable for the object of the invention, and amongst the etheric oils should be considered oil of cloves, oil of rosemary and turpentine, preferably Venetian turpentine.

The oil should furthermore be so viscous that it will not flow out while handling the glass sheet after impression of the oil. On the other hand the oil should be so thin that it may be employed for the transfer of the decoration on to the glass sheet by employment of the usual printing methods. In order to achieve the correct consistency it is expedient to use an addition of a diluting agent. Hereby it has been found that the evaporative power of the diluting agent employed is of essential importance. Therefore, according to the invention it is expedient that a diluting agent with an evaporative power of about 600 is added to the oil. As an example of such a diluting agent may be mentioned glycol monoacetate.

A preferred oil composition according to the invention has the following composition:

25% Venetian turpentine
50% oil of cloves
25% glycol monoacetate.

According to the invention it is advantageous to employ coloured metallic oxides as pigment, such as titanic oxide, ferric oxide, chromic oxide or a mixture of such metallic oxides, e. g., a mixture of zinc oxide and titanic oxide. However, such inorganic metallic compounds which will decompose at bending temperature of the glass and form metallic oxides may also be employed.

The invention however is not limited to employment of mineral oxide pigments, as any pigment is employable which is able to give the desired colour at the bending temperature of the glass.

Employment of a flux which melts at the bending temperature of the glass is necessary for securing the melting-on of the pigment to the surface of the glass. In the ordinary glasses commonly used bending of the glass takes place at a temperature of approximately 850° C., and consequently it has been found advantageous to employ a flux which melts at 400–450° C.

Such fluxing agents are known per se, but according to the invention it has been found especially advantageous to employ a mixture of bismuthous subnitrate, quartz and borax. Such a composition may consist of 90% of bismuthous subnitrate, 3% of quartz and 7% of borax.

By employment of the method according to the invention it has furthermore surprisingly been found possible to produce decorations in two or more colours when employing fluxes in the various dye powders, the melting point of said fluxes being sufficiently far apart from each other, so that one colour is melted into the surface of the glass before the other dye powder begins to melt.

Hereby it is possible to proceed in the following manner:

The plane glass sheet is first passed through the offset machine to superinduce oil in a desired pattern, whereupon dye powder is blasted on and absorbed by the oil on the decorated places.

By this means the oil will be absorbed by the dye powder and form a layer which does not rub off when the decorated glass sheet again is passed through the offset machine in order to receive a supplementary decoration in oil.

When another dye powder is now blasted on it has been found that it adheres only to the surface where the new oil has been superinduced, and if it is so arranged that the flux in the two dye powders has sufficiently divergent melting points then the two colours will not intermix when the decorated glass sheet is placed in the mould and bent as described.

The invention also relates to an apparatus for carrying out the method in question, the apparatus being characteristic in that it comprises a pre-heating chamber which is in direct communication with a heating or bending chamber in which bending of the glass plate or sheet takes place, and that the heating or bending chamber is in direct communication with a cooling chamber, whereas means are provided for conveyance of moulds and glass plates or sheets through said chambers.

Thus the apparatus according to the invention differs from the hitherto known apparatus intended for the purpose in question, by the preheating chamber, the heating or bending chamber and the cooling chamber being interconnected and forming per se a unit. This compact construction gives a very simplified mode of procedure and is especially suited to automatic and continuous operation. To this must be added that the cooling period is very considerably reduced by means of the construction according to the invention, which will appear more fully from the following details. A considerable economy in the cost of installation is attained by this construction.

Furthermore, the heating or bending chamber according to the invention is suitably constructed as an oven heated by gas or oil, the oven being on one side provided with an opening through which it communicates with the pre-heating chamber, and on the other side with an opening through which it communicates with the cooling chamber. This construction provides a simplified conveyance of the moulds with glass plates from one chamber to another.

This conveyance may according to the invention take place by means of a conveyer track extending through the pre-heating chamber, the heating or bending chamber and the cooling chamber. It is preferred to let the conveyor track constitute the floor surface in the said chambers. This conveyor may be constructed as an endless conveyor belt, or better as a revolving table. Hereby a construction is obtained which is better suited to continuous operation, as the same operator who removes the formed glass articles after the latter have left the cooling chamber may place plane glass sheets in the emptied moulds for introduction into the pre-heating chamber.

As previously mentioned the construction of the moulds employed is of essential importance in order to obtain the desired result. The heat emission of the mould should be adapted to the size and thickness of the glass plate or sheet of which the formed glass article is produced, so that the glass plate and mould is cooled mainly at the same rate. Thus, it has been found that it is expedient to manufacture the mould of a thin plate resting on a ring. This construction of a mould opens good possibilities for cooling of the mould in step with the cooling of the bent glass plate. Furthermore, it has proved expedient to provide the mould with holes, preferably in the bottom.

Further characteristic features of the invention will appear from the following, where the method itself will be more fully explained with reference to the drawing in which is shown an embodiment of the apparatus according to the invention.

Fig. 1 is a top view of the apparatus.

Fig. 2 a side view of the apparatus.

Fig. 3 a cross section on the line III—III of Fig. 1 in unfolded condition.

Fig. 4 a cross section on the line IV—IV of Fig. 1 on a larger scale.

In the drawing 1 is a pre-heating chamber, 2 a heating or bending chamber or oven, 3 a cooling chamber and 4 a table. The pre-heating chamber, the oven and the cooling chamber are built together and arranged stationarily, while the table 4 is rotary mounted on a central support or column 5 which is secured to the floor by a base 6. Round the column 5 is placed a sleeve 8 which is secured to an annular iron plate 10 on the table 4 by radial rods 9, see Fig. 1. Furthermore, the table 4 is supported by a rim of supporting struts 11, see Fig. 2, which are secured outside on the sleeve 8 as well as to the bottom plate 12 of the table 4. A suitable bearing arrangement not shown is provided between the column 5 and the sleeve 8 enabling the table to rotate round the column by means of a driving arrangement not shown.

On the bottom plate 12 of the table 4 secured to the inside iron plate 10, see Fig. 4, are placed refractory bricks 13 which on the inside are provided with an upward protruding rim 14 and on the outside with a corresponding rim 15.

The pre-heating chamber 1, the oven 2 and the cooling chamber 3 are supported by iron beams 16, see Fig. 3, and suspended in angle iron bars 17, one end of which is secured to the front rim of the oven 2, and the other end of which is secured to a ceiling not shown.

The oven has three pipes 18 with valves 19 for inflow of a combustible mixture of gas and air. However, the pipes may also be arranged for burning of oil. All the pipes are led through the wall 20 of the oven and are provided inside with a wire netting 21 as a bar against blow-back of the flames. At the back the oven is provided with an opening 22 which may be closed with a door 23, to which is secured a wire 24 connected to a counter-balance 28 over a wheel 25 mounted on an oven, and a wheel 26 mounted on a lever 27. The opening 22 gives access to the interior of the oven, whereas ignition of the inflowing mixture of gas may take place through this opening. The oven is furthermore provided on top with an exhaust 29 having a damper 30 for carrying away the combustion products. Besides, it is lined with refractory bricks and covered with iron plates 31.

The oven is on one side provided with an opening 32, see Fig. 3, through which the oven communicates with the pre-heating chamber 1 the floor of which is composed of the table 4 and the sides and ceiling of which are constructed of two iron plates, respectively 33 and 34, with an intermediate layer of rock-wool 35. The pre-heating chamber 1 is slightly wider than the ring-shaped table 4, and its side walls extend somewhat down below the upper rims of the table, see Fig. 1.

The oven 2 on the other side is provided with an opening 36, through which it communicates with the cooling chamber 3 which is constructed in a manner corresponding to the pre-heating chamber 1, however, with the difference that it is provided at its outlet with a downwardly protruding plate 37.

The moulds employed for carrying out the method may be of the design shown in Fig. 4. The mould 38 shown here which is intended for production of glass bowls is constructed of a thin steel plate with a thickness of a few millimetres, and rests loosely on a ring 39. The mould is provided with holes 40 in the bottom, and in the moulds has been placed a glass sheet or disc 41 from which the glass bowl is to be produced. These holes are valuable in assisting an appropriate cooling rate to be effected in the cooling chamber. They are furthermore indispensable when producing decorated glass articles, since otherwise the decomposition products of the decorating composition cannot escape freely.

The method according to the invention may be performed in the following way by employment of the shown apparatus:

The oven 2 is first heated to such a temperature that a glass sheet or plate placed in the oven becomes so soft that it may be bent without any melting of the glass taking place. A temperature of about 850° C. will usually be suitable. Moulds 38, 39 containing glass plates 41 which are preferably treated as described to provide the desired decoration during the bending process are then placed on the table 4 in front of the pre-heating chamber 1, and the table is made to rotate slowly at a rate adapted to the composition and thickness of the glass plates of which the formed articles are being produced by bending of the glass in the oven 2. By employment of ordinary glasses with a thickness of 2 and 3 mm. a rotating rate of the table of about 300 mm. a minute will be suitable.

By the passage of the moulds through the pre-heating chamber 1 a suitable pre-heating of the glass will take place by means of the heat from the oven 2. At the same time the volatile components contained in the oil absorbed by dry colouring powder on the glass surface evaporate. During the passage of the moulds through the oven 2 the glass plates will become so soft that they sink down in the mould to rest against the walls of the latter. The organic compounds of the decorating composition will be burnt away, the flux will melt, take up the colours and adhere to the glass surface. The moulds with the glass bent down then pass through the opening 36 to the cooling chamber 3 and are evenly cooled by passing through this chamber to a temperature of about 200° C., at which temperature they leave the cooling chamber.

The formed articles are then removed from the moulds, and a new plane glass plate, provided with a decorating composition, if desired, is placed in the mould and conveyed to the pre-heating chamber.

From the time the moulds are introduced into the pre-heating chamber 1 until they leave the cooling chamber 3, about 16 minutes will lapse at the above mentioned rotating rate of the table, the detention in the cooling chamber constituting just over half of the time. While formerly several hours were required to relieve the stresses arisen by the bending, it is now possible according to the invention to reduce the stress-relieving cooling to a fraction of an hour.

The invention is not limited to the embodiment shown in the drawing nor to production of articles of glass of a special shape, except to a maximum bending of 40%. As shown and described it is preferred to use concave moulds, but convex moulds may also be used.

The main feature of the invention is the direct transfer of the moulds from the oven space where bending takes place, to the cooling chamber, in which the glass is evenly and slowly cooled at the range of temperature producing the stresses, the range of temperature lying between 500° and 300° C. for the ordinary glasses, in connection with the use of the special moulds described and shown.

This principle offers special advantages in production of glass bowls, dessert plates, ash trays of glass, glass armatures for electrical lighting bodies and similar formed articles of glass, where it is of great importance that stresses do not occur in the glass, and that conditions may be created for a rational and quick mass production.

Having thus fully described my invention I claim as new and desire to secure by Letters Patent:

1. A method of producing articles of glass by bending a plane glass sheet which comprises placing the plane glass sheet in a sheet metal mould having the shape of the article to be formed, the thickness of the sheet metal walls of the mould bearing such a relationship to the thickness of the glass that the mould and the formed glass give off heat at substantially the same rate during the cooling stage after bending, preheating said mould and said plane glass in a preheating zone, transferring said preheated mould and plane glass to a heating and bending zone wherein the plane glass is heated to a softening temperature to bend and conform the plane glass to the shape of the mould, transferring said mould and bent glass directly into a cooling zone shielded from the outside atmosphere wherein the internal stresses in the formed glass are relieved by the gradual cooling.

2. A method of producing formed articles of glass by bending a plane glass sheet which comprises placing said plane glass sheet in a sheet metal mould having the shape of the glass article to be formed, said sheet metal mould having walls of a predetermined thickness which in relation to the thickness of the formed glass will give off heat from the mould at substantially the same rate as the heat given off by the formed glass during the cooling stage after bending, said sheet metal mould supported on a carrier by an annular sheet metal supporting member having a small face in contact with said mould and which spaces the mould from the carrier, preheating said mould, glass sheet and supporting member by the conveying movement of said carrier into a preheating zone, heating and bending the plane glass in the mould in a heating and bending zone into which said mould, glass and supporting member are conveyed by the carrier, the temperature in the heating and bending zone being sufficient to soften the plane glass to cause it to bend and conform to the shape of the mould, and cooling said mould and bent glass by the movement of the carrier into a cooling zone which is shielded from the outside atmosphere, the temperature in the cooling zone being such as to permit the cooling of the mould and the formed glass sheet at substantially the same rate to relieve the internal stresses in the formed glass.

3. A method of producing formed articles of glass by bending a plane glass sheet, which comprises placing the plane glass sheet on a sheet metal mould which is perforated at its base and supported on a carrier, the thickness of the sheet metal walls of the mould bearing such a relationship to the thickness of the glass that the perforated mould and the formed glass give off heat at substantially the same rate during the cooling stage after bending and heating the mould and said plane glass in a heating zone, passing said carrier, mould and glass sheet successively through a preheating zone, and a heating and bending zone, to gradually heat said glass sheet to a temperature at which it bends to conform to said mould, and transferring said mould and said glass sheet directly from said heating and bending zone to an annealing leer and cooling said mould and glass sheet in said leer.

References Cited in the file of this patent

UNITED STATES PATENTS

| Number | Name | Date |
| --- | --- | --- |
| 276,897 | Schulze-Berge | May 1, 1883 |
| 280,143 | DeVoursney | June 26, 1883 |
| 417,097 | Scott | Dec. 10, 1889 |
| 477,568 | Nichols et al. | June 21, 1892 |
| 632,908 | Dorpols | Aug. 29, 1899 |
| 934,094 | Peterson | Sept. 14, 1909 |
| 1,243,362 | Terrell et al. | Oct. 16, 1917 |
| 1,389,583 | Frazier | Sept. 6, 1921 |
| 2,111,392 | Galey | Mar. 15, 1938 |
| 2,131,873 | Goodwillie | Oct. 4, 1938 |
| 2,160,560 | Parkinson | May 30, 1939 |
| 2,377,849 | Binkert et al. | June 12, 1945 |
| 2,452,488 | Paddock et al. | Oct. 26, 1948 |
| 2,470,461 | Black | May 17, 1949 |
| 2,486,153 | Gwyn | Oct. 25, 1949 |
| 2,587,152 | Harlan et al. | Feb. 26, 1952 |